Figure 3:
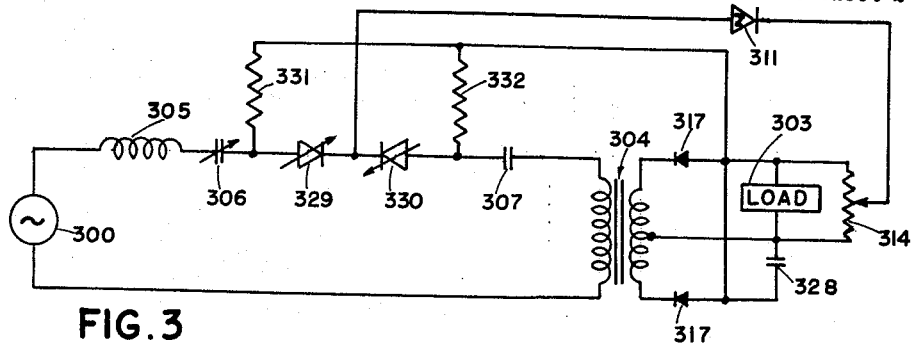

May 11, 1965
R. H. PINTELL
3,183,432
VOLTAGE OR CURRENT REGULATOR
Filed Aug. 18, 1961
3 Sheets-Sheet 1
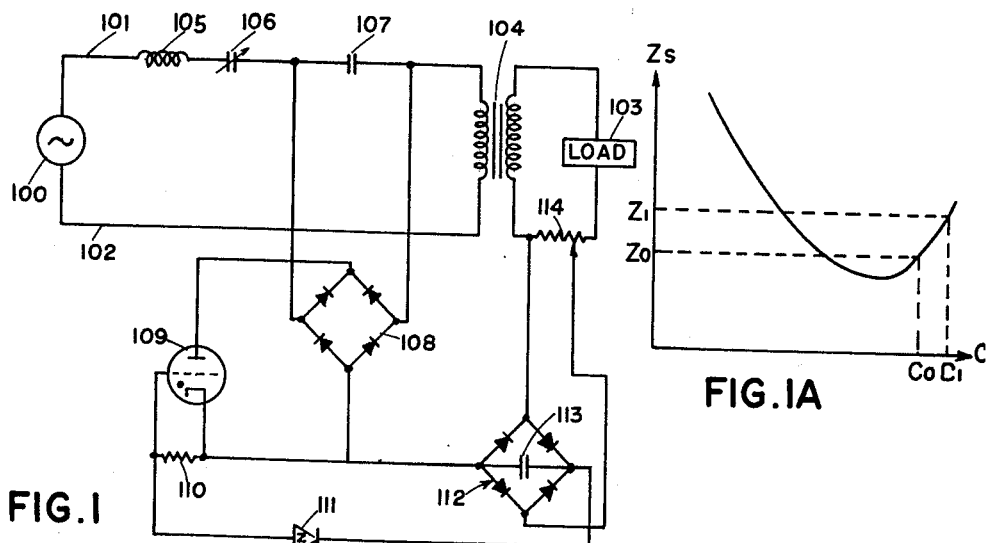
FIG.1
FIG.1A
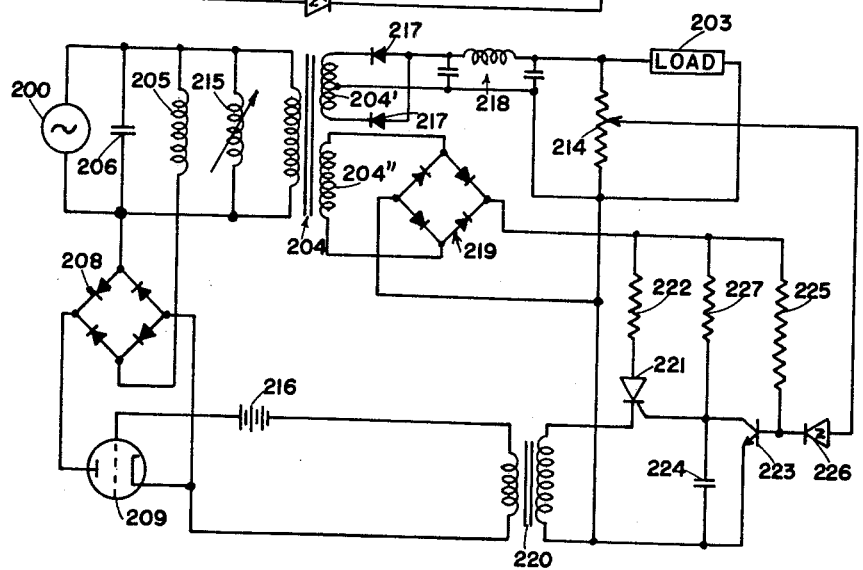
FIG.2
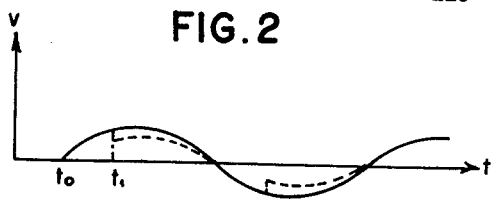
FIG.2A
Robert Pintell
INVENTOR.
BY
AGENT.

May 11, 1965 — R. H. PINTELL — 3,183,432
VOLTAGE OR CURRENT REGULATOR
Filed Aug. 18, 1961 — 3 Sheets-Sheet 2

Robert Pintell
INVENTOR.

BY
Karl F. Ross
AGENT.

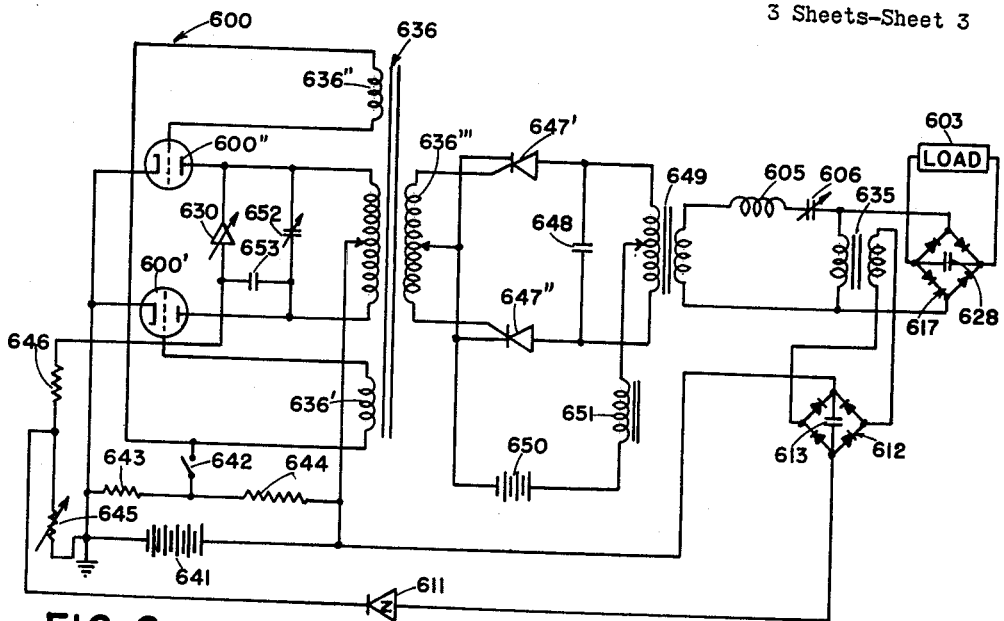

United States Patent Office 3,183,432
Patented May 11, 1965

3,183,432
VOLTAGE OR CURRENT REGULATOR
Robert H. Pintell, New York, N.Y., assignor to Intron International, Inc., Bronx, N.Y., a corporation of New York
Filed Aug. 18, 1961, Ser. No. 132,454
21 Claims. (Cl. 323—66)

My present invention relates to a circuit arrangement for stabilizing the magnitude of a variable electrical quantity, such as voltage and/or current, determining the amount of energy delivered to a load.

It is an object of this invention to provide an improved circuit arrangement of this character in which the desired regulatory effect is realized without the interposition of wasteful variable resistances and without the generation of odd wave shapes rich in harmonics which are rejected by some types of loads.

Another object of the instant invention is to provide a regulating system having means for returning substantially all unwanted excess output energy to the source instead of dissipating it, thereby maintaining a high efficiency under diverse operating conditions.

A further object of my invention is to provide an improved and highly sensitive regulator adapted to be used, with only minor adjustments, for stabilizing such parameters as voltage, current and power factor by simple means.

In accordance with the present invention I provide, in combination with an input circuit including a source of alternating current, a transmission circuit for delivering energy from the source to a load, the transmission circuit comprising a network resonant at a frequency close to the operating frequency of the source; either the input circuit or the transmission circuit (or possibly both) is provided with a frequency-determining element controlled by a feedback connection from the load circuit for changing the tuning of the resonant network with respect to the source frequency so that a sharp variation in the reactance of the transmission circuit and, therefore, in the delivery of energy to the load circuit ensues upon even a small departure of load voltage, current or power factor from a predetermined value, the nature of this variation being such as substantially to compensate for such departure.

The frequency-determining element may be adjustable continuously or in steps. In particular, it may be a triggerable three-electrode breakdown device, such as a controlled rectifier or a thyratron, which remains conductive until extinguished by a suitable quenching circuit which may include a full-wave or half-wave rectifier passing pulsating current. In the latter case the invention enables a switchover from one impedance condition to another to be maintained during portions of each half-cycle of the operating frequency whose durations are variable in accordance with the extent of the departure to be compensated; this arrangement, in contradistinction to known systems in which conduction is completely cut off during part of a cycle, enables the load voltage to vary sinusoidally in both operating conditions.

A variety of elements responsive to currents or voltages are available for this purpose; some of these will be particularly described, by way of example, in the following detailed description given with reference to the accompanying drawing in which:

FIGS. 1–7 are circuit diagrams illustrating different regulators according to the invention; and
FIGS. 1A, 2A, 6A and 7A are graphs used in explaining the modes of operation of the embodiments of FIGS. 1, 2, 6 and 7 respectively.

In FIG. 1, I have shown a source 100 of alternating current which is representative of any constant-frequency source, including mechanical generators, electronic oscillators and receivers of electromagnetic waves transmitted from a remote location. Source 100 and its leads 101, 102 constitute an energy-input circuit coupled with a load 103 by an output transformer 104 and a transmission circuit here shown to comprise an inductance coil 105 and two condensers 106, 107 in series therewith. Condenser 107, which constitutes the frequency-determining element of this circuit, is shunted by a rectifier bridge 108 whose direct-current terminals are connected across the main electrodes of a thyratron 109 representative of various three-electrode amplifier devices; the latter has its cathode and grid interconnected by a resistor 110 which lies in series with an avalanche-type breakdown device 111, such as a Zener diode, and the D.-C. terminals of another rectifier bridge 112 shunted by a smoothing condenser 113. The A.-C. terminals of bridge 112 are adjustably connected across a control resistor 114 in series with load 103; it should be noted that this resistor, serving merely as a feedback impedance, is low-ohmic and does not dissipate any substantial part of the energy delivered to load 103 by transformer 104.

The system of FIG. 1, designed to stabilize the current drawn by the load 103, operates as follows:

The series-resonant circuit 105, 106, 107 is tuned to a frequency slightly lower than that of source 100, as will be apparent from FIG. 1A in which its impedance $Z_s$ has been plotted against the combined capacitance $C$ of its condensers 106, 107 of which the former is shown to be adjustable. Normally, thyratron 109 is in a state of high resistance and blocks substantially all current flow from bridge 108 so that condenser 107 is fully effective; the series circuit 105–107 then has a capacitance $C_0$ corresponding to a relatively low impedance $Z_0$.

When the load current exceeds a predetermined maximum, the output voltage of bridge 112 breaks down the Zener diode 111 and renders the thyratron 109 sufficiently conductive to place a virtual short circuit across the supplemental condenser 107. Tube 109 is quenched at the end of each half-cycle of pulsating current from bridge 108. The capacitance of the series circuit now rises to a value $C_1$ with a corresponding increase in impedance to a value $Z_1$ as the tuning of the resonant circuit shifts to a point more remote from the operating frequency of source 100. Thus, less energy is delivered to transformer 104 by this source and the current through load 103 and control resistor 114 is reduced. In this manner the magnitude of the load current, averaged over a period of time, can be stabilized.

Corresponding elements of subsequent figures have been indicated therein by reference numerals identical with those used in FIG. 1 except for a change in the hundreds digit.

The system of FIG. 2, while similar to the embodiment just described, serves for the stabilization of load voltage rather than load current. The alternating output of source 200 is impressed upon the primary of coupling transformer 204 by way of a transmission circuit including a parallel-resonant network 205, 206, 215 shunted across this primary. Coil 205 lies in series with a rectifier bridge 208 and the plate-cathode space of a vacuum triode 209 which is normally maintained conductive by a biasing battery 216 connected between its grid and its cathode. Element 215 is a coil of adjustable inductance, the magnitudes of the reactances 205, 206, 215 being so selected that their parallel combination constitutes a network with a resonant frequency slightly lower than the output frequency of source 200 so that the system, like the one of FIG. 1, operates on a steeply sloping part of the resonance characteristic of its tuned network.

Transformer 204 has two secondaries of which one, designated 204′, feeds the load 203 by way of a pair of full-wave rectifiers 217 and a low-pass filter 218. Load 203 is shunted by a high-ohmic control resistor 214 which supplies a predetermined portion of the load voltage to a feedback circuit including the other secondary 204'' of the transformer. The latter energizes a rectifier bridge 219 delivering raw-rectified current to the primary of a feedback transformer 220 in series with a controlled rectifier 221 and a resistor 222 connected to its anode; the gate of this controlled rectifier is returned to the positive terminal of bridge 219 by way of the collector-emitter circuit of an NPN transistor 223 shunted by a condenser 224. The base of the latter transistor is connected to the same positive bridge terminal through another resistor 225 and to an adjustable tap on control resistor 214 through a Zener diode 226 poled to oppose the output current of bridge 219. The input circuit of triode 209 also includes the secondary of transformer 220. A further resistor 227 joins the positive terminal of bridge 219 to the gate of controlled rectifier 221 and the collector of transistor 223. The latter conducts during the pulsations produced by bridge 219 and condenser 224 remains substantially discharged during normal operation.

When the voltage across load 203 becomes excessive, resistor 214 develops across Zener diode 226 a potential difference, transmitted via the emitter/base circuit of transistor 223, which breaks down the diode 226 and drives the base of this transistor negative, thereby blocking the discharge of condenser 224 and causing the appearance of a positive voltage on the gate of controlled rectifier 221. The latter is thus triggered to conduct until quenched at the end of the half-cycle of the pulsation from bridge 219. Transformer 220 thereupon impresses on tube 209 a blocking pulse of variable width depending on the magnitude of the feedback voltage from potentiometer 214, this pulse overcoming the bias of battery 216 to cut off the tube. Inductance coil 205 is now open-circuited so that the resonance frequency of the network in shunt with source 200 drops along with its impedance; as a result, an increased part of the output energy of source 200 is returned to that source and the load current is reduced without appreciable losses. The load voltage V, whose wave shape as a function of time $t$ is shown in FIG. 2A, rises along the solid-line curve at instant $t_0$ and changes abruptly to the dotted-line curve at instant $t_1$ when the Zener diode 226 breaks down; it should be noted that both voltage curves are sinusoidal. The interval $t_0$–$t_1$ varies with the magnitude of the feedback.

In FIG. 3 the transmission circuit between source 300 and output transformer 304 includes an inductance coil 305 in series with an adjustable condenser 306, a fixed condenser 307 and two voltage-responsive variable capacitors 329, 330 connected back-to-back. Transformer 304 works into a load circuit including a pair of full-wave rectifiers 317, a smoothing condenser 328 and, shunted across the load 303, a control resistor 314. A variable tap on resistor 314 is tied by way of a Zener diode 311 to the junction of the cathode plates of the capacitor diodes 329, 330 while one of the extremities of that resistor, joined to the negative side of the rectifier circuit, is connected to the anode plates of these capacitors by way of respective resistors 331, 332. The resistor 314 thus impresses a control potential of reverse polarity upon the capacitor diodes 329, 330 whereby their capacitance is reduced upon an increase in load voltage. Normally, i.e. in the absence of any current flow through resistor 314, the series-resonant network 305, 306, 307, 329, 330 is tuned to a frequency slightly higher than the operating frequency of source 300 so as to offer a small reactive impedance to the output of that source; with rising load voltage the decrease in the capacitance of diodes 329, 330, upon a breakdown of Zener diode 311, drives the series network further off resonance with the source 300 so that its reactance grows progressively larger to counteract the increase in load voltage. The system of FIG. 3, with its continuously variable frequency-determining elements 329, 330, can be adjusted by proper setting of variable condenser 306 and potentiometer 314 to operate on a bend in the characteristic of the Zener diode 311 when the load voltage is at its desired value so that any departure from that value will be sharply counteracted by a corrective biasing of diodes 329, 330.

Figure 4:
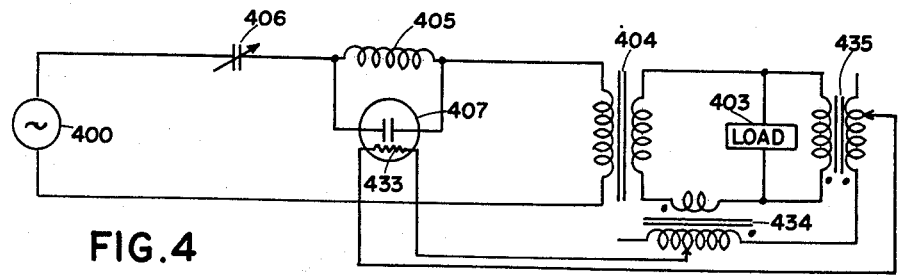

In FIG. 4 I have illustrated a circuit arrangement adapted to compensate for variations in power factor. Source 400 works into a transmission circuit which is essentially of the series-resonant type, its manually presettable condenser 406 being in series with an inductance 405 and a variable condenser 407 shunted thereacross. Condenser 407 is here shown to be of the temperature-sensitive type, e.g. with a dielectric of polyvinyl-fluoride film as disclosed in commonly assigned application Ser. No. 98,357, filed March 27, 1961, by Milton H. Pintell, and is controlled by a heating filament 433 connected in series with the secondaries of two control transformers 434, 435. The primary of step-up transformer 434, connected as a current transformer in series with load 403, and the primary of step-down transformer 435, connected as a voltage transformer across the load, are serially included in the output circuit of transformer 404; their secondaries are so poled, as conventionally indicated by the dots alongside these windings, that their voltages buck each other so that under normal operating conditions, with a load current having a power factor of unity, substantially no current flows through the heating filament 433 and the condenser 407 is at its minimum capacitance. It should be noted that this capacitance is substantially less than that of condenser 406 and merely reduces the effect of the inductance of coil 405 in series with that condenser; under the normal conditions specified, the circuit 405–407 resonates at a frequency slightly below the operating frequency of source 400.

If the power factor of the output circuit of transformer 404 drops off, e.g. because of a change in the load 403 toward greater inductivity, the voltages induced in the secondaries of transformers 434, 435 are relatively dephased and a heating current traverses the filament 433 to increase the capacitance of the frequency-determining element 407. This action further unbalances the reactances of the branches 406 and 405, 407 of the series network so that its resonance frequency decreases and its overall impedance at the operating frequency becomes more strongly capacitive whereby a current with leading phase angle, compensating for the lowered power factor, is transmitted to transformer 404.

The thermosensitive condenser 407, representing another type of continuously variable frequency-determining element, can be used to advantage where the changes in the variable to be stabilized (here the power factor) occur at a relatively slow rate; it will be apparent that, if necessary, a less sluggish element such as one of the voltage-response capacitor diodes 329, 330 may be utilized in its stead. Also, stepped rather than continuous compensation through the effective addition or removal of an auxiliary reactance, as shown for the condenser 107 and the coil 215 in FIGS. 1 and 2, may be employed.

Figure 5:
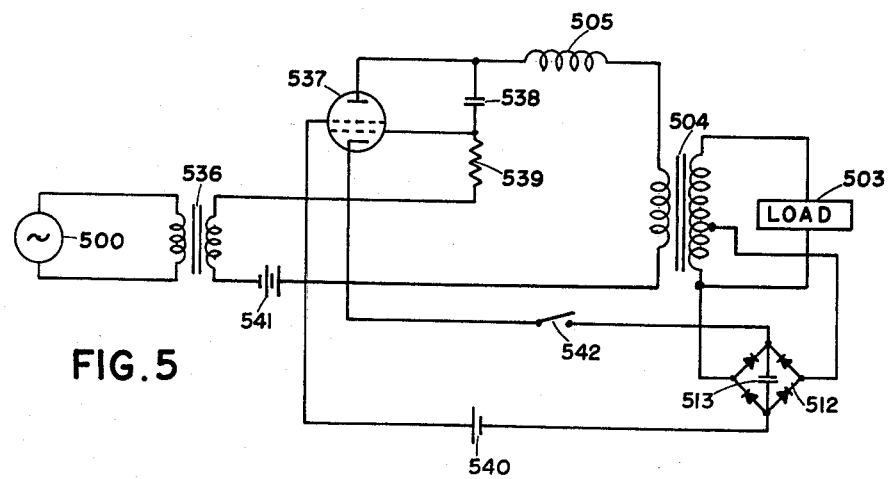

The modification of FIG. 5 shows an input circuit with a source 500 connected across the primary of a coupling transformer 536 whose secondary energizes an output transformer 504 by way of a transmission circuit including a reactance tube 537 in series with an inductance 505. Tube 537 is a vacuum tetrode with a feedback condenser 538 connected between its plate and one of its grids to give it a capacitive reactance. A grid-leak resistor 539 is connected across its cathode and plate in series with condenser 538; its other grid is returned to the cathode via a source of positive bias, shown as a battery 540, and the D.-C. diagonal of a rectifier bridge 512 whose A.-C. terminals are connected across a portion of the secondary of load transformer 504 which feeds the load 503. Bridge 512, connected in parallel with a smoothing condenser 513, is so poled as to counteract the positive grid bias provided by battery 540. Another battery 541, serving as a source of plate voltage for tube 537, is connected across the main electrodes thereof in series with the secondary of transformer 536, coil 505 and the primary of transformer 504. A starting switch is shown at 542.

The series-resonant circuit represented by tube 537 and coil 505 is tuned to a frequency slightly above that of source 500 so that its predominantly reactive impedance is mainly capacitive. When the load voltage increases, the feedback-controlled grid of tube 537 is driven more negative by the output of bridge 512 and the reactance of the tube rises, thereby sharply augmenting the initially small impedance of the transmission circuit between transformers 536 and 504.

Whereas in the preceding embodiments I have shown the relative tuning between an alternating-current source and a resonant network in a transmission circuit to be variable with the aid of a frequency-determining element included in the transmission circuit, I shall now describe with reference to succeeding figures several circuit arrangements for varying the frequency of the source in order to stabilize the voltage or the current delivered to a load. In FIG. 6 the current source 600 is shown as a pair of push-pull-connected vacuum triodes 600', 600" with grounded cathodes and with their plates connected across the primary winding of an input transformer 636 which is tuned by an adjustable shunt capacitor 652 and, in parallel therewith, by a further condenser 653 lying in series with a voltage-responsive capacitor diode 630. The positive pole of a battery 641, whose negative pole is grounded, is tied to the midpoint of the primary of transformer 636, this battery being bridged by a voltage divider consisting of two resistors 643, 644. The junction of these resistors is connected through a starting switch 642 by way of respective secondaries 636', 636" of transformer 636 to the grids of tubes 600', 600". A similar voltage divider, consisting of a variable resistor 645 and a fixed resistor 646, grounds the junction of capacitors 653, 630 and has the common terminal of its resistors connected via a Zener diode 611 to the negative D.-C. terminal of a rectifier bridge 612 provided with a smoothing condenser 613; the other D.-C. terminal of that bridge is joined to the positive pole of battery 641.

The input circuit containing source 600 also includes a pair of push-pull-connected controlled rectifiers 647', 647" whose gates are connected across the secondary 636''' of transformer 636 and whose anodes, bridged by a condenser 648, are interconnected by the primary of a coupling transformer 649. A battery 650 is connected between the midpoint of this primary and the cathodes of the control rectifiers in series with a choke 651. The controlled rectifiers 647', 647" are thus alternately blocked and unblocked by the oscillations of source 600 and produce a substantially rectangular voltage wave transmitted to a rectifier bridge 617 with smoothing condenser 628 by way of a series-resonant network consisting of an inductance 605 and an adjustable condenser 606. Load 603 is connected across the D.-C. terminals of bridge 617 whose A.-C. terminals are shunted by the primary of a feedback transformer 635, the output of the latter serving to energize the bridge 613.

Normally, i.e. with the output of feedback bridge 612 blocked by the Zener diode 611, diode 630 has a high capacitance and the operating frequency of source 600 is at a relatively low value; this frequency has been indicated at $F_0$ in the graph of FIG. 6A which shows the series impedance $Z_s$ of network 605, 606 plotted against the source frequency F. Impedance $Z_s$ is of relatively low magnitude $Z_0$ until the load voltage rises to a point at which negative potential from bridge 612 is impressed upon the junction of capacitors 653 and 630 to lower the capacitance of the latter. This raises the operating frequency F to, say, the point $F_1$ corresponding to an increased series reactance $Z_1$ in the transmission circuit over which the load 603 is energized. Again, therefore, the load voltage is substantially stabilized at a desired value.

In FIG. 7 the source 700 is represented by an oscillator comprising two push-pull-connected transistors 700', 700" working into a transformer 736 with saturable core. The bases of these transistors are connected, via respective secondary windings 736', 736", to the junction of a voltage divider which consists of a resistor 743 and a rectifier 744 bridged across a battery 741 in series with an auxiliary transistor 754. This transistor is, in turn, shunted by a voltage divider composed of a variable resistor 745 and a fixed resistor 746, their junction being connected to its base and also, through a Zener diode 711, to the positive output terminal of a rectifier bridge 712 shunted by a smoothing condenser 713; the negative output terminal of the bridge is returned to the grounded negative pole of battery 741. The input diagonal of bridge 712 lies in series with the load 703 and the secondary of an output transformer 714 whose primary, together with the secondary of transformer 736, forms part of a transmission circuit which serially includes between these transformer windings a parallel-resonant network composed of a coil 705 and an adjustable condenser 706. A starting switch is again shown at 742.

Normally, in the high-resistance condition of Zener diode 711, the transistors 700', 700" when conducting during alternate half-cycles pass positive pulses from battery 741 to the collector of transistor 754 at the junction of resistors 743 and 745. The relatively positive potential impressed upon the base of transistor 754 by the suitably adjusted voltage divider 745, 746 enables these pulses to pass readily to ground so that substantially the full voltage of battery 741 lies across the generator 700. When, however, negative voltage from bridge 712 breaks through the Zener diode 711, transistor 754 is driven toward cutoff and the effective driving voltage for the generator is reduced so that saturation of the core of transformer 736 is developed and its operating frequency drops. It should be understood that the resistances connected in circuit with battery 741 dissipate only a relatively small amount of energy and that the actual regulatory effect stems from the change in frequency which initially has the magnitude $F_0$, as shown in FIG. 7A, and is reduced under excess-current conditions to a value of, say $Z_1$; the impedance $Z_0$ of parallel-resonant circuit 705, 706 rises correspondingly from $Z_0$ to $Z_1$. It will be apparent from FIG. 7A that this parallel-resonant circuit is tuned to a frequency slightly lower than the operating frequency $F_0$ of source 700.

As has been explained in connection with FIG. 3, the circuits of FIGS. 6 and 7 can readily be adjusted to stabilize the load voltage or current at a value corresponding to a bend on the characteristic of the Zener diode 611 or 711 whereby even slight changes in the controlled output variable will bring about a sharp corrective adjustment. If these Zener diodes were omitted, the systems would operate in substantially the same manner but be less sensitive.

Naturally, the embodiments described and shown are merely illustrative of the various ways in which my invention may be realized; variations and modifications thereof, including substitutions or combinations of compatible features from different embodiments, will be readily apparent to persons skilled in the art and are intended to be embraced within the spirit and scope of the invention as defined in the appended claims.

I claim:

1. A circuit arrangement for supplying electrical energy to a load while substantially stabilizing a load-dependent electrical parameter of which said energy is a function, comprising an input circuit including a source of alternating current, a transmission circuit coupling said input circuit to said load, a network in said transmission circuit having a resonance frequency in the vicinity of the operating frequency of said source, the frequency of said source lying on a steeply sloping portion of the resonance curve of said network, frequency-determining means in one of said circuits including a source of unidirectional pulses substantially in cadence with said source of alternating current for shifting said resonance frequency and said operating frequency relatively to each other whereby the reactance of said network is altered, and feedback means coupled with said load and with said frequency-determining means for actuating the latter in a sense tending to compensate for changes in said parameter, said frequency-determining means comprising a voltage-responsive capacitor forming part of said network.

2. A circuit arrangement for supplying voltage and current, at least one of which is a variable parameter, to a load while substantially compensating for departures of said quantity from a predetermined value comprising an input circuit including a source of alternating current, a transmission circuit coupling said input circuit to said load, a network in said transmission circuit, said source of alternating current having an operating frequency on a steeply sloping portion of the resonance curve of said network, frequency-determining means in one of said circuits responsive to an increase of said parameter for shifting the resonance frequency of said network and said operating frequency further away from each other whereby the reactance of said network is raised, and feedback means coupled with said load and with said frequency-determining means for actuating the latter in a sense tending to compensate for changes in said parameter.

3. A circuit arrangement for supplying voltage and current, at least one of which is a variable quantity, to a load while substantially compensating for departures of said quantity from a predetermined value, comprising an input circuit including a source of alternating current, a transmission circuit coupling said input circuit to said load, a network in said transmission circuit, said source having an operating frequency on a steeply sloping portion of the resonance curve of said network, frequency-determining means in one of said circuits responsive to an increase of said variable quantity for shifting the resonance frequency of said network and said operating frequency further away from each other whereby the reactance of said network is raised, and feedback means coupled with said load and with said frequency-determining means for actuating the latter in a sense tending to compensate for changes in said parameter, said feedback means including an avalanche-type diode in series with said frequency-determining means and reverse-biasing means for maintaining said diode in a state of high resistance close to its breakdown point upon said quantity having said predetermined value.

4. A circuit arrangement according to claim 1 wherein said frequency-determining means comprises a reactance element forming part of said network.

5. A circuit arrangement according to claim 4 wherein said reactance element is a voltage-responsive capacitor.

6. A circuit arrangement according to claim 4 wherein said reactance element is a thermosensitive condenser.

7. A circuit arrangement according to claim 4 wherein said reactance element is a reactively connected amplifier device.

8. A circuit arrangement according to claim 4 wherein said frequency-determining means further comprises a controllable three-electrode device in series with said reactance element.

9. A circuit arrangement according to claim 4 wherein said frequency-determining means further comprises a controllable three-electrode device in parallel with said reactance element.

10. A circuit arrangement according to claim 2 wherein said source includes an oscillator of variable frequency, said frequency-determining means being included in said input circuit and coupled with said oscillator for adjusting its operating frequency.

11. A circuit arrangement according to claim 10 wherein said oscillator is provided with reactance means for controlling its operating frequency, said frequency-determining means including part of said reactance means.

12. A circuit arrangement according to claim 11 wherein said frequency-determining means further comprises a controllable three-electrode device connected in said input circuit for varying the effective reactance of said part.

13. A circuit arrangement according to claim 10 wherein said oscillator is provided with a saturable core and a source of driving voltage for periodically saturating said core, said frequency-determining means including impedance means in said input circuit for varying the effective magnitude of said driving voltage.

14. A circuit arrangement according to claim 2 wherein said parameter is the current through said load, said feedback means including an impedance in series with said load.

15. A circuit arrangement according to claim 2 wherein said parameter is the voltage across said load, said feedback means including an impedance in parallel with said load.

16. A circuit arrangement according to claim 2 wherein said parameter is the power factor of the current supplied to said load, said feedback means including two impedance elements connected in series-opposed relationship with each other and lying in shunt and in series, respectively, with said load.

17. A circuit arrangement according to claim 14 wherein said impedance elements are transformers.

18. A circuit arrangement according to claim 2 wherein said frequency-determining means includes a three-electrode breakdown device triggerable by said feedback means and quenching means for periodically restoring said breakdown device to a high-impedance condition.

19. A circuit arrangement for supplying voltage and current, at least one of which is a variable parameter, to a load while substantially compensating for departures of said quantity from a predetermined value, comprising an input circuit including a source of alternating current, a transmission circuit coupling said input circuit to said load, a network in said transmission circuit, said source of alternating current having an operating frequency on a steeply sloping portion of the resonance curve of said network, frequency-determining means including a source of unidirectional pulses substantially in cadence with said source of alternating current in one of said circuits responsive to an increase of said parameter for shifting the resonance frequency of said network and said operating frequency further away from each other whereby the reactance of said network is raised, and feedback means coupled with said load and with said frequency-determining means for actuating the latter in a sense tending to compensate for changes in said parameter.

20. A circuit arrangement for supplying electrical energy to a load while substantially stabilizing a load-dependent electrical parameter of which said energy is a function, comprising an input circuit including a source of alternating current, a transmission circuit coupling said input circuit to said load, a network in said transmission circuit having a resonance frequency in the vicinity of the operating frequency of said source, frequency-determining means in one of said circuits for shifting said resonance frequency and said operating frequency relatively to each other whereby the reactance of said network is altered, and feedback means coupled with said load and with said frequency-determining means for actuating the latter in a sense tending to compensate for changes in said parameter, said feedback means including an avalanche-type diode in circuit with said source of unidirectional pulses and reverse-biasing means for maintaining said diode in a state of high resistance close to its breakdown point upon said parameter having a predetermined value.

21. A circuit arrangement for supplying voltage and current, at least one of which is a variable quantity, to a load while substantially compensating for departures of said quantity from a predetermined value, comprising an input circuit including a source of alternating current, a transmission circuit coupling said input circuit to said load, a network in said transmission circuit, said source having an operating frequency on a steeply sloping portion of the resonance curve of said network, frequency-determining means including a source of unidirectional pulses substantially in cadence with said source of alternating current in one of said circuits responsive to an increase of said variable quantity for shifting the resonance frequency of said network and said operating frequency further away from each other whereby the reactance of said network is raised, and feedback means coupled with said load and with said frequency-determining means for actuating the latter in a sense tending to compensate for changes in said parameter, said feedback means including an avalanche-type diode in series with said frequency-determining means and reverse-biasing means for maintaining said diode in a state of high resistance close to its breakdown point upon said quantity having said predetermined value.

References Cited by the Examiner
UNITED STATES PATENTS

| | | | |
|---|---|---|---|
| 2,437,837 | 3/48 | Saretzky | 323—76 |
| 2,753,512 | 7/56 | Helterline et al. | 323—76 |
| 3,046,466 | 7/62 | Tyrrell et al. | 323—76 |
| 3,095,533 | 6/63 | Keizer | 321—15 |

LLOYD McCOLLUM, *Primary Examiner.*

ROBERT C. SIMS, *Examiner.*